United States Patent
Junker et al.

[15] 3,664,945
[45] May 23, 1972

[54] ARRANGEMENT FOR THE ELECTROLYTIC REMOVAL OF METAL

[72] Inventors: Jurgen Junker, Munich; Richard Schleupen, Grossingershein, both of Germany

[73] Assignee: Robert Bosch GmbH, Stuttgart, Germany

[22] Filed: June 16, 1970

[21] Appl. No.: 46,622

[30] Foreign Application Priority Data

June 18, 1969 Germany .................. P 19 30 765.4

[52] U.S. Cl. ........................................ 204/228, 204/143 M
[51] Int. Cl. ........................................ B01k 3/00, B23p 1/00
[58] Field of Search .................. 204/228, 143 R, 143 M

[56] References Cited

UNITED STATES PATENTS

| | | | |
|---|---|---|---|
| 3,524,804 | 8/1970 | Gotz et al. | 204/228 X |
| 3,520,791 | 7/1970 | Pfau et al. | 204/228 X |
| 3,548,257 | 12/1970 | Drushel et al. | 204/143 M X |
| 3,533,927 | 10/1970 | Manning | 204/143 M |
| 3,496,088 | 2/1970 | Pfau et al. | 204/228 X |

*Primary Examiner*—John H. Mack
*Assistant Examiner*—D. R. Valentine
*Attorney*—Michael S. Striker

[57] ABSTRACT

An arrangement for the electrolytic removal of metal from a metallic workpiece. An electrolyte in contact with the workpiece is held within a container to which negative potential is applied from a DC source. The workpiece has positive potential applied to it. The workpiece is connected in series with a reference circuit consisting of silicon diodes, and the anode-cathode path of a thyristor is connected in parallel with the series combination of the reference circuit, the workpiece, the electrolyte and the container therefor. Connected, furthermore, in parallel with the reference circuit, are the emitter-collector paths of a plurality of transistors with bases connected to the container at negative potential. The voltage drop across the reference circuit is made at least as large as the anode voltage required for switching the thyristor to the conducting state when the workpiece contacts the container maintained at negative potential.

16 Claims, 1 Drawing Figure

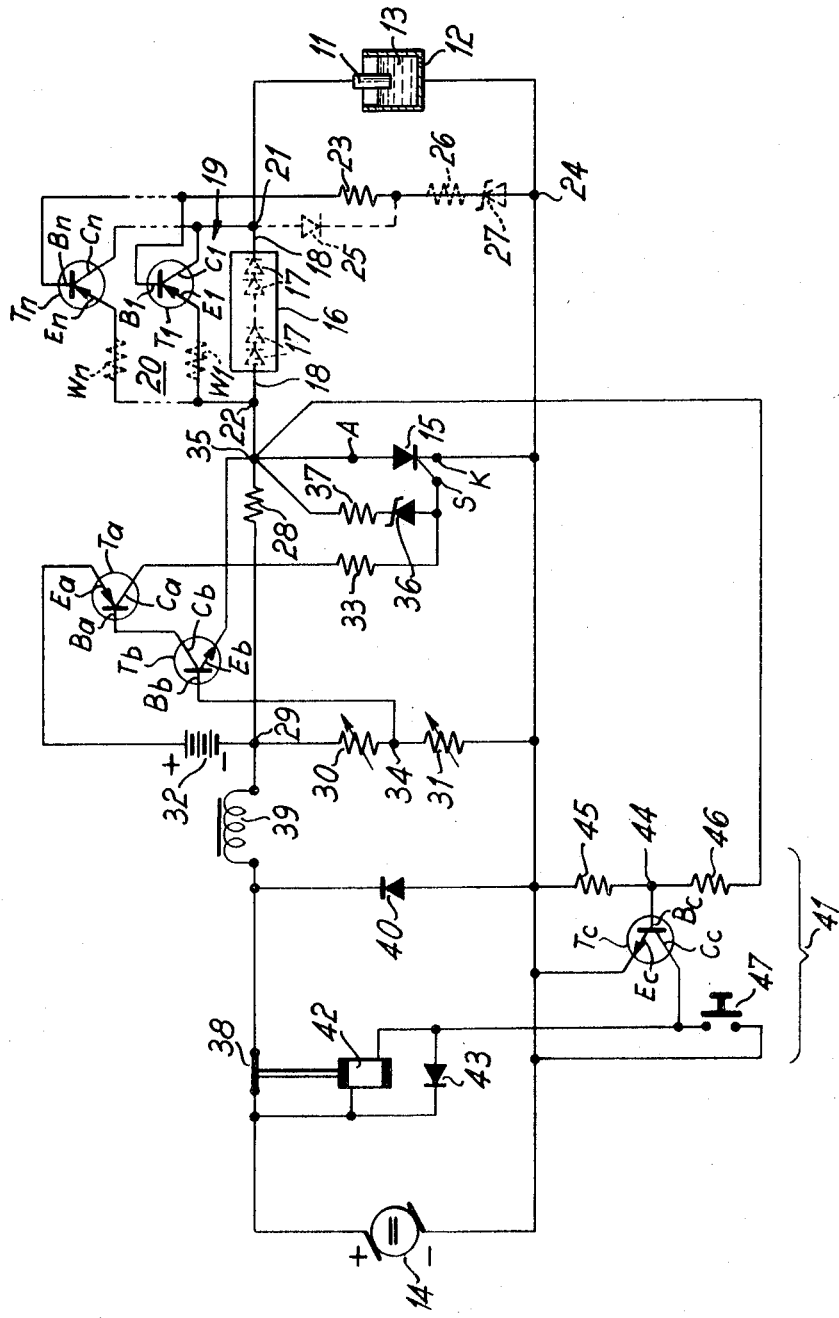

ARRANGEMENT FOR THE ELECTROLYTIC REMOVAL OF METAL

BACKGROUND OF THE INVENTION

The present invention resides in an arrangement for removing metal electrolytically from a workpiece, which is in contact with an electrolyte and the positive terminal of a DC current source. Also in contact with the electrolyte is an electrode connected to the negative terminal of the DC source. The workpiece is also electrically connected to the anode of a thyristor which has its cathode, in turn, connected to the electrode having negative potential applied to it. The switching of the anode-cathode path to the conducting state is made dependent upon the condition that the space between the workpiece and the electrode with negative potential applied to it, becomes reduced to a predetermined threshold.

The electrolytic removal of metal has particularly the advantage that it is possible to work on very hard metal.

In order to achieve effective removal of the metal, the space between the workpiece and the electrode with negative potential is made as small as possible. At the same time, the electrolyte is pressed into this space through pressure. It is then usually not possible to avoid that the space between the workpiece and electrode of negative potential becomes reduced below a predetermined value or threshold, and this causes very large current. In the extreme case when the workpiece contacts the electrode with negative potential applied to it, a saturated short-circuit current results. The consequences of this situation can produce, for example, vibrations of the operating arrangement, oscillations of the electrolyte through the fluid under pressure in the space, as well as non-uniformities and accumulation of conductive portions on the workpiece or on the electrode at negative potential.

In order that the workpiece and the electrode at negative potential do not become damaged as a result of high field strength which gives rise to flash-overs or through excessive heating resulting from high current, a simple protection arrangement is introduced thus far in the circuit section including the workpiece, the electrolyte, as well as the electrode at negative potential. The protective arrangement consists of connecting in parallel with this circuit section, the anode-cathode path of the thyristor. The switching of this anode-cathode path to the conducting state was made dependent upon the condition that the space between the workpiece and the electrode at negative potential has dropped below a predetermined threshold value. The dangerous high currents do not appear then through the aforementioned circuit section, but instead are conducted through the anode-cathode path of the thyristor. The disadvantage of this conventional protective arrangement resides in the limitation that the space between the workpiece and the electrode at negative potential cannot be made sufficiently small for switching the anode-cathode path of the thyristor. This is due to the condition that the voltage drop prevailing between the workpiece and the electrode at negative potential must still be sufficient to provide the anode voltage for switching of the thyristor.

Accordingly, it is an object of the present invention to provide an electrical arrangement in which the aforementioned disadvantage can be avoided in such conventional design.

The object of the present invention becomes achieved by providing a reference path in series with the workpiece, the electrolyte, and the electrodes at negative polarity. This series combination of elements is, furthermore, connected in parallel with the anode-cathode path of the thyristor. The voltage drop across the reference path, upon contact of the workpiece with the electrode at negative potential, is at least so large as the anode voltage required to switch the anode-cathode path of the thyristor to the conducting state.

SUMMARY OF THE INVENTION

An arrangement for electrolytical removal of metal from a workpiece. The workpiece is connected to the positive terminal of a DC source and is in contact with an electrolyte contained within a vessel serving as the negative electrode in the electrolytic process. A thyristor with anode-cathode path is effectively connected across the DC source and the series combination containing the workpiece, the electrolyte and the electrolyte-containing vessel. A reference circuit consisting of a plurality of silicon diodes is connected between the anode of the thyristor and the workpiece. In parallel with the reference circuit, furthermore, are the emitter-collector paths of a plurality of transistors. The bases of these transistors are connected, through a resistor, to the vessel which is at negative potential. The series circuit of a zener diode and resistor, moreover, is also bridged between the control electrode of the thyristor and its anode. The arrangement is such that the voltage drop across the reference circuit is at least as large as the anode voltage required for switching the thyristor to the conducting state when the workpiece contacts the vessel at negative potential.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electrical circuit diagram showing the component elements and their interconnections whereby electrolytic removal of metal from a workpiece is achieved in accordance with the present invention.

DESCRIPTION OF THE PREFERRED EMBODIMENTS

Referring to the drawing, metal is to be electrolytically removed from a workpiece 11. The workpiece 11 is arranged in relation to an electrode 12 of opposite polarity, and electrolyte 13 is in contact with both the workpiece 11 and the electrode 12. The electrode 12 is connected to the negative potential terminal of a DC current source 14, whereas the workpiece 11 is electrically connected to the positive terminal of this source. The DC source 14 supplies high power at low voltage of approximately 20 volts, and is designed in the form of a conventional DC generator with thyristor regulation.

The position terminal of the DC current source 14 leads to the anode A of a thyristor 15, in addition to the workpiece 11. The cathode K of this thyristor is connected to the negative terminal of the DC source 14. The switching of the anode-cathode path A–K is dependent upon the condition that the space between the workpiece 11 and the electrode 12 is diminished by a predetermined amount.

Connected in parallel with the anode-cathode path A–K of the thyristor 15, is a series circuit including the electrode 12, the electrolyte 13, the workpiece 11, and a reference path 16. The voltage drop across this reference path 16 is at least as large as the required anode voltage at the thyristor 15 for switching the latter on so that the anode-cathode path A–K conducts, when the workpiece 11 contacts the electrode 12. It has been found that the reference path 16 is preferably designed through one or more silicon diodes 17 connected in series, as shown in phantom or dashed lines in the drawing. The silicon diodes are interconnected so that their direction of conduction corresponds to the effective current flow direction.

The reference path 16, furthermore, is connected within a circuit branch 18 which is in parallel with a circuit branch 19 of an electrically controlled circuit 20. The switching of the circuit path 19 which is in the conducting state when in the normal operative condition, is also made dependent upon the reduction of the space between the workpiece 11 and the electrode 12 by a predetermined amount.

The electrically controlled switching circuit 20 can be constructed of at least one controllable semi-conductor element. A circuit which is particularly adapted to this purpose can be derived at when the circuit 20 consists of a plurality of transistors $T_1 \ldots T_n$. The emitter-collector paths $E_1–C_1 \ldots E_n–C_n$ of these transistors are connected in parallel with each other, and thereby form the entire switching path 19. In the simplest case, the collectors $C_1 \ldots C_n$ can be all connected together and to the workpiece 11, as well as the reference circuit 16. The connection for all of these elements can be accomplished through the junction 21.

The emitters $E_1 \ldots E_n$ can, furthermore, be all connected together and to the reference circuit 16 as well as the anode A of the thyristor, by all being joined at the circuit junction 22. The bases of all of these transistors, as designated by $B_1 \ldots B_n$, can preferably all be connected together and joined to a trimming resistor 23 which leads to the negative potential of the DC source 14 and the electrode 12, through the circuit junction 24.

It is possible to improve the circuitry, furthermore, by providing a separate individual resistor $W_1 \ldots W_n$ in series with each emitter of each transistor. One terminal of all these emitter-resistors is joined to the circuit junction 22. Still further improvement is possible by providing a diode 25 with cathode connected to one terminal of the resistor 23, and with anode of the diode 25 connected to the circuit junction 21. A resistor 26, moreover, is connected between the cathode of the diode 25 and the cathode of a zener diode 27 having its anode connected to the circuit junction 24.

For the purpose of controlling the thyristor 15, a resistor 28 is connected with one terminal to the positive voltage supply of the source 14. The other terminal of the resistor 28 is connected to the anode A of the thyristor 15. The resistance value or ohmic value of the resistor 28 is made substantially smaller than the resistance of the reference circuit 16. One terminal of the resistor 28 is connected to the circuit junction 29 to which a voltage divider is connected in the form of two variable resistors 30 and 31. The other terminal of the voltage divider 30,31 is connected to the negative supply of the DC source 14. The negative terminal of an auxiliary current source 32, furthermore, is also connected to the circuit junction 29. The positive terminal of this auxiliary source 32 is connected to the emitter E$a$ of a transistor T$a$. This transistor T$a$ has its collector connected to a resistor 33 which leads to the control electrode S of the thyristor 15. The base B$a$ of the transistor T$a$ is connected to the collector C$b$ of the transistor T$b$. The base B$b$ of a transistor T$b$ is connected to the circuit junction of the two resistors 30 and 31 of the voltage divider. The emitter E$b$ is connected to the anode A of the thyristor 15 and the circuit junction 35 to which also the resistor 28 is connected.

It is further desirable to connect the control electrode S of the thyristor 15 to the anode of the zener diode 36. The cathode of this zener diode is, in turn, connected to a resistor 37 which leads to the circuit junction 35.

The circuit path leading from the positive terminal of the current source 14 to the workpiece 11, moreover, also includes a switching contact 38 and an induction coil 39. These two elements are connected in series with one terminal of the induction coil 39 connected to the circuit junction 29, and the switching contact 38 being connected to the positive terminal of the source 14, in normal operation. At the circuit junction between the switching contact 38 and the induction coil 39, the cathode of a diode 40 is connected. The anode of this diode 40 is, in turn, connected to the negative terminal of the DC source 14.

The switching contact 38 belongs to a fail-safe or safety arrangement 41 which includes an electromagnet coil 42 for the purpose of actuating the switching contact 38. One terminal of the coil 42 is also connected to the positive terminal of the DC source 14 as well as the cathode of the diode 43. The other terminal of the coil 42 is connected to the anode of the diode 43 as well as the collector C$c$ of a transistor T$c$. The emitter E$c$ of this transistor T$c$ is connected to the negative terminal of the DC source 14, whereas the base B$c$ is connected to the circuit junction 44 of two resistors 45 and 46 constituting a voltage divider. This voltage divider 45,46, in turn, is connected between the negative terminal of the source 14 and the circuit junction 35. In addition thereto, is a manually operated switch 47, connected between the anode of the diode 43 and the negative terminal of the DC source 14.

In operation, current flows from the workpiece 11 to the electrode 12, through the electrolyte 13, as soon as the DC source 14 provides operating voltage. The effect of such current flow is to remove metal from the surfaces of the workpiece in contact with the electrolyte. Under normal operating conditions, the supply voltage appears essentially between the workpiece 11 and the electrode 12. The potential difference between the circuit junctions 22 and 34 is, thereby, so small that it is not sufficient to switch the emitter-collector path, E$b$–C$b$ of the npn transistor T$b$ to the conducting state. As a result, the emitter-collector path E$a$–C$a$ of the pnp transistor T$a$, is also in the turned-off or cut-off state. The control electrode S of the thyristor 15 remains, thereby, unaffected, and the anode-cathode path A–K of this thyristor remains therefore in the non-conducting state. In contrast therewith, the potential difference between the circuit junction 22 and 24 is so large that it is sufficient to switch to the conducting state the emitter-collector paths $E_1–C_1 \ldots E_n–C_n$ of the transistors $T_1$ to $T_n$ which form the circuit arrangement 20. With these latter transistors in the turned-on or conducting state, the reference path 16 is bridged. This condition has the advantage that during normal operation, no unnecessary power need be consumed from the reference circuit or path 16.

If the decoupling resistors $W_1 \ldots W_n$ are applied, very uniform current distribution may be realized with respect to the emitter-collector paths $E_1–C_1 \ldots E_n–C_n$.

It has been found desirable, furthermore, to drive the transistors $T_1 \ldots T_n$ above saturation, with diode 25 providing for this purpose.

In order that the transistors $T_1 \ldots T_n$ are switched precisely for fixed values or parameters, it has been found desirable to use the zener diode 27. The resistor 26 prevents the short circuit through the diode 25.

If the clearance between the workpiece 11 and the electrode 12 decreases so much that it falls below a predetermined value, the difference in voltage between the junctions 22 and 24 is no longer sufficient to keep the emitter-collector paths $E_1–C_1 \ldots E_n–C_n$ conductive. The bridging of the reference circuit or path 16 becomes, thereby, removed. The voltage drop across the reference path or circuit 16 now provides in each case the anode voltage necessary for switching on the thyristor 15. This situation also applies to the condition when the workpiece 11 contacts directly the electrode 12. The reference path or circuit 16 protects, at the same time, the transistors $T_1 \ldots T_n$ from excessively high collector-emitter voltage.

The turning on or switching on of the thyristor 15 occurs when the circuit junction 22 has become negative to the extent that the potential difference between this circuit junction 22 and the junction 34 is sufficient to switch to the conducting state, the emitter-collector path E$b$–C$b$ of the transistor T$b$. This condition applies upon reduction of the space between the workpiece 11 and the electrode 12. As a result thereof, the emitter-collector path E$a$–C$a$ of the transistor T$a$ also becomes switched to the conducting state, whereby the auxiliary current source 32 applies a positive potential to the control electrode S of the thyristor 15. The anode-cathode path A–K of the thyristor 15, becomes thereby also conducting and receives the current flow from that branch of this circuit which includes the workpiece 11 and the electrode 12.

In view of the now-conducting anode-cathode path A–K of the thyristor 15, the fail-safe or safety arrangement 41 also becomes operative. Thus, the circuit junction 22 becomes effectively connected to the negative terminal of the DC source 14, through the anode-cathode path A–K. The potential difference between the circuit junction 44 and the negative terminal of the DC source 14 is then no longer sufficient to maintain in the conducting state, the emitter-collector path E$c$–C$c$ of the transistor T$c$. As a result, the current circuit through the electromagnet 42 becomes interrupted and the associated switching contact 38 becomes, thereby, opened. With this state of the switching contact, the supply voltage for the arrangement is removed or disconnected. Reconnection of the supply voltage can be established, for example, through manual closure of the switch 47.

The diode 43 is provided for inhibiting high voltage spikes across the electromagnet 42. In view of the diode 40, the induction coil 39 cannot cause damaging effects upon opening of the switching contact 38.

The series circuit between the circuit junction 35 and the control electrode S of the thyristor 15 and including the zener diode 36 and resistor 37, is useful for switching the anode-cathode path A-K to the conducting state when undesirable excessive voltages appear. Such excessive voltages can, for example, arise from the induction coil 39 upon sudden current cut off, and as a result the workpiece 11 may be damaged through erosion.

It will be understood that each of the elements described above, or two or more together, may also find a useful application in other types of constructions differing from the types described above.

While the invention has been illustrated and described as embodied in an arrangement for removing metal electrolytically, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for electrolytic removal of metal from a workpiece comprising, in combination, a source of DC current for applying positive potential to said workpiece; electrode means for holding an electrolyte, said electrode means being connected to the negative potential of said source of DC current; thyristor means with cathode connected to said electrode means, the anode of said thyristor being for connecting to said workpiece; reference means for connecting in series with said workpiece, said electrolyte, and said electrode means for forming a series combination in parallel with the anode-cathode path of said thyristor means, the voltage drop across said reference means being at least as large as the anode voltage required for switching said thyristor means to the conducting state when said workpiece contacts said electrode means, whereby the switching of said thyristor means is dependent on the spacing between workpiece and electrode means being below a predetermined magnitude, said thyristor means switching when said spacing between workpiece and electrode means is substantially less than the spacing required between said workpiece and electrode means for switching said thyristor means with said anode connected directly to said workpiece.

2. The arrangement as defined in claim 1 wherein said reference means comprises a plurality of silicon diodes connected in series.

3. The arrangement as defined in claim 1 including an electrically controllable switching means connected in parallel with said reference means and having conducting and non-conducting states, the switching of said controllable switching means to the non-conducting state being dependent upon the space between said workpiece and said electrode means.

4. The arrangement as defined in claim 3 wherein said thyristor means and said electrically controllable switching means are operable through a control voltage dependent upon the magnitude of space between said workpiece and said electrode means.

5. The arrangement as defined in claim 4 wherein said control voltage operates said thyristor and said electrically controllable switching means so that upon reduction of said space between said workpiece and said electrode means, said electrically controllable switching means is first switched to the non-conducting state and said thyristor means is then switched to the conducting state.

6. The arrangement as defined in claim 5 wherein said thyristor is switched to said conducting state latest when said workpiece contacts said electrode means.

7. The arrangement as defined in claim 3 wherein said electrically controllable switching means comprises at least one controllable semi-conductor element.

8. The arrangement as defined in claim 3 wherein said electrically controllable switching means comprises a plurality of transistors with emitter-collector paths connected in parallel.

9. The arrangement as defined in claim 8 wherein the emitters of the transistors are connected to the junction between said reference means and the anode of said thyristor means and the collectors of said transistors are connected to a junction between said reference means and said workpiece, the bases of said transistors being connected to said electrode means.

10. The arrangement as defined in claim 9 including resistor means connected between said bases and said electrode means.

11. The arrangement as defined in claim 9 including a resistor connected in series with each emitter of said transistor, each resistor being connected between one emitter of one transistor and said junction between said reference means and said anode of said thyristor means.

12. The arrangement as defined in claim 8 wherein said transistors are operatively driven into saturation.

13. The arrangement as defined in claim 4 including zener diode means and resistor means connected in series for forming a bridging circuit connected between the anode of said thyristor means and the control electrode of said thyristor means.

14. The arrangement as defined in claim 1 including disconnecting means connected to said source of DC current for disconnecting said source of DC current independence of the conducting state of the thyristor means.

15. The arrangement as defined in claim 10 including auxiliary resistor means connected between said resistor and said electrode means.

16. The arrangement as defined in claim 15 including zener diode means connected between said auxiliary resistor means and said electrode means.

* * * * *